3,157,622
RESINOUS COMPOSITIONS
Eugene P. Goldberg, Des Plaines, Ill., assignor to General Electric Company, a corporation of New York
No Drawing. Filed Jan. 3, 1961, Ser. No. 80,019
3 Claims. (Cl. 260—77.5)

This invention relates to polycarbonate resins and to their preparation. More particularly, it relates to polycarbonate compositions containing as a constituent part thereof hydrogenated dihydric phenol-derived carbonate units, in which the carbonate radical is directly attached to a nuclear atom, i.e., to a carbon atom of a hydrogenated aromatic ring.

Various types of polycarbonate resins are known, among which are those prepared by vinyl polymerization of unsaturated carbonate esters, such as allyl carbonates and the like, from ester interchange of carbonate esters with glycols, and by the reaction of dihydroxymonoaryl compounds, such as hydroquinone and resorcinol with phosgene or carbonate esters. Such polycarbonate materials are of limited use because they do not have a community of desirable physical properties. More useful are those polycarbonate resins which contain carbonate units derived from dihydric phenols and copolymers of such carbonate resins with other materials.

Briefly, the compositions of this invention comprise carbonate polymers or resins containing structural units derived from hydrogenated dihydric phenols, the carbonate units being attached directly to hydrogenated aromatic ring carbon atoms.

Any hydrogenated dihydric phenol compound is useful in the practice of this invention, such dihydric phenol being defined as a mononuclear or polynuclear dihydric phenol in which the hydric or hydroxyl groups are attached directly to aromatic ring carbon atoms. The hydrogenated dihydric phenol compounds used in connection with the invention can typically be represented by the general formula I 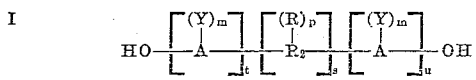

where R is a monovalent hydrocarbon radical, for example, alkyl radicals (e.g., methyl, ethyl, propyl, isopropyl, butyl, decyl, etc.), aryl radicals (phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents therein, such as halogen (chlorine, bromine, fluorine, etc.). It will be understood that where more than one R is used, they may be alike or different. $R_2$ is selected from the group consisting of an alkylene and alkylidene residue such as methylene, ethylene, propylene, propylidene, isopropylidene, butylene, butylidene, isobutylidene, amylene, isoamylene, amylidene, isoamylidene, cyclohexylidene, etc. $R_2$ can also be a silane radical or can be polyalkoxy, such as polyethoxy, polypropoxy, polythioethoxy, polybutoxy, polyphenylethoxy, or polyorganosiloxy, for example polydimethylsiloxy, polydiphenylsiloxy, polymethylphenylsiloxy, etc. $R_2$ can also consist of two or more alkylene or alkylidene groups such as above, separated by the residue of an aromatic nucleus, a tertiary amino radical, an ether radical, a carbonyl radical, silane radical or siloxy radical, or by a sulfur-containing radical such as sulfide, sulfoxide, sulfone, etc. $R_2$ may also be a glycol dibasic acid ester residue derived from, for example, dibasic acids such as adipic, azelaic, sebacic, isophthalic, terephthalic and other acids. Other groupings which can be represented by $R_2$ will occur to those skilled in the art. A is the hydrogenated residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from 0 to 1, $t$ and $u$ are whole numbers including zero. When $s$ is zero, however, either $t$ or $u$ may be zero, and not both.

In the hydrogenated dihydric phenol compound, the substituent Y may be the same or different as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where $s$ is zero in Formula I, the aromatic nuclei are directly joined with no intervening alkylene or alkylidene or other bridge. The positions of the hydroxy groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of hydrogenated dihydric phenol compounds that may be employed in this invention include 2,2-bis-(4-hydroxycyclohexyl)-propane (hydrogenated Bisphenol-A); 2,4'-dihydroxydicyclohexyl)-methane; bis-(2-hydroxycyclohexyl)-methane; bis-(4-hydroxycyclohexyl)-methane; bis-(4-hydroxy-5-nitrocyclohexyl)-methane; bis-(4-hydroxy-2,6-dimethyl-3-methoxycyclohexyl) - methane; 1,1 - bis - (4-hydroxycyclohexyl)-ethane; 1,2-bis-(4-hydroxycyclohexyl)-ethane; 1,1-bis-(4-hydroxy-2-chlorocyclohexyl)-ethane; 1,1-bis-(2,5-dimethyl-4-hydroxycyclohexyl)-ethane; 1,3-bis-(3-methyl-4-hydroxycyclohexyl)-propane; 2,2-bis-(3-phenyl-4-hydroxycyclohexyl) - propane; 2,2 - bis - (3 - isopropyl-4-hydroxycyclohexyl) - propane; 2,2 - bis - (4 - hydroxynaphthyl)-propane; 2,2-bis-(4-hydroxycyclohexyl)-pentane; 3,3-bis-(4-hydroxycyclohexyl)-pentane; 2,2-bis-(4-hydroxycyclohexyl)-heptane; bis-(4-hydroxycyclohexyl)-phenyl methane; bis-(4-hydroxycyclohexyl)-cyclohexyl methane; 1,2-bis-(4-hydroxycyclohexyl)-1,2-bis-(phenyl) ethane; 2,2-bis-(4-hydroxycyclohexyl)-1,3-bis(phenyl) propane; 2,2-bis-(4-hydroxycyclohexyl)-1-phenyl propane; and the like. Also included are hydrogenated dihydroxybenzenes typified by hydrogenated hydroquinone and hydrogenated resorcinol; also dihydroxydicyclohexyl such as 4,4'-dihydroxydicyclohexyl; 2,4'-dihydroxydicyclohexyl; also hydrogenated dihydroxynaphthalenes such as hydrogenated 2,6-dihydroxynaphthalene, etc. Hydrogenated dihydroxy aryl sulfones, such as those set forth in application Serial No. 613,817, filed October 4, 1956, assigned to the same assignee as this invention, are also useful, e.g., bis-(4- hydroxycyclohexyl)-sulfone; 2,4'-dihydroxydicyclohexyl sulfone; 5'-chloro-2,4'-dihydroxydicyclohexyl sulfone; 5'-chloro-2,4'-dihydroxydicyclohexyl sulfone; 3-chloro-4,4'-dihydroxydicyclohexyl sulfone; bis-(4-hydroxycyclohexyl) biphenyl disulfone, etc. The preparation of these and other useful sulfones is described in Patent 2,288,282—Huissmann. Hydrogenated polysulfones as well as substituted sulfones using halogen, nitrogen, alkyl radicals, etc., are also useful. Hydrogenated dihydroxy aromatic ethers such as those set forth in application Serial No. 598,768, filed July 19, 1955, assigned to the same assignee as this invention, are also useful. Methods of preparing such materials are found in Chemical Reviews, 38, 414–417 (1946) and Patent 2,739,171—Linn. Exemplary of such hydrogenated dihydroxy aromatic ethers are 4,4'-dihydroxydicyclohexyl ether; 4,4'-dihydroxytricyclohexyl ether; the 4,3'-4,2'-, 3,3'-, 2,2'-2,3'-, etc. dihydroxydicyclohexyl ethers; 4,4' - dihydroxy - 2,5 - dimethyldicyclohexyl ether; 4,4'-dihydroxy-2,6-dimethyldicyclohexyl ether; and 4,4'-dihydroxy-3,3'-di-isobutyldicyclohexyl ether. Mixtures of the hydrogenated dihydric phenols or the dihydroxy cycloaliphatic compounds derived therefrom can also be employed and where these compounds are mentioned herein, mixtures of such materials are considered to be included.

When a carbonate ester is used in the preparation of the polycarbonate, the ingredients are reacted at temperatures from about 150° C. to 300° C. or higher for times varying from 1 to 15 or more hours. Under such conditions, an ester interchange occurs between the carbonate ester and the hydrogenated dihydric phenol compound. The ester interchange is advantageously carried out at reduced pressures of around 10 to 100 mm. of mercury, preferably in an inert atmosphere such as of nitrogen, argon, krypton, etc., to prevent undesirable oxidative effects, especially where higher reaction temperatures are used under moderate subatmospheric pressures. Heating under vacuum after the ester interchange is substantially complete (vacuum cooking), for example, at from about 150° C. at 0.01 to 5 to 10 mm. of mercury for extended periods of time tends to increase the molecular weight of the carbonate polymer.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum, iron, cobalt, nickel, silver, gold, tin, antimony, lead, barium, strontium, platinum, palladium, etc. and compounds thereof such as alcoholates, oxides, carbonates, acetates, hydrides, etc. Additional catalysts and variations in the ester exchange methods are discussed in Groggins' "Unit Processes in Organic Synthesis" (4th edition, McGraw-Hill Book Company, 1952), pages 616 to 620. The amount of such catalyst is usually quite small and is of the order of 0.001 to 0.1 percent, by weight, based on the total weight of the reactants.

The diaryl carbonates useful in this connection can be represented by the general formula

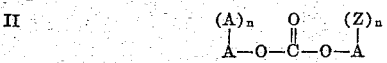

where A is an organic residue in the same sense as in Formula I, Z is an inorganic radical in the same sense as Y of Formula I, and n is an integer. Examples of carbonate esters comprise symmetrical carbonates, for example, diphenyl carbonate, di-(halo-phenyl) carbonates, e.g., di-(chlorophenyl) carbonate, di-(bromophenyl) carbonate; di-(polyhalo-phenyl) carbonates, e.g., di-(trichlorophenyl) carbonate, di-(tribromophenyl) carbonate, etc.; di-(alkylphenyl) carbonates, e.g., di-(tolyl) carbonate, etc., di-(naphthyl) carbonate, di-(chloronaphthyl) carbonate, etc., unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916) and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl, ditolyl, and dinaphthyl carbonates by passing phosgene through a column of the phenol in the presence of a catalyst, etc.

Employing the above method of preparing the polycarbonate polymers by ester interchange using a vacuum cook, the products in the final stages of the reaction become quite viscous and difficult to handle. I therefore prefer generally to carry out the reaction using phosgene or phosgene-producing or a phosgene-like dibasic acid halide in an organic basic material such as a tertiary amine (e.g., pyridine, dimethylaniline, quinoline, etc.). The base can be used undiluted or diluted with inert solvents, for example, hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction.

Although the phosgene reaction can be carried out over a wide range of temperatures, for example, from below 0° C. to over 100° C., the reaction proceeds satisfactorily at 25° C. to 50° C. Since the reaction is exothermic, the rate of phosgene addition can be used to control the reaction temperatures. Substantially equimolar amounts of phosgene can be used, although an excess of up to 0.5 mole or more may be employed.

Suitable phosgene-like dibasic acid halides, in addition to phosgene, include, for example, dibromo and diiodocarbonyls as well as the bishaloformates of hydrogenated dihydric phenols (e.g., bischloroformates of hydrogenated hydroquinone, hydrogenated Bisphenol-A, etc.) Other carbonate precursors will occur to those skilled in the art.

It will be seen that whether a carbonate ester or phosgene-like material is used in the reaction, the hydrogenated dihydric phenol will produce a hydrogenated dihydric phenol carbonate structural unit which can typically be represented by the following general formula wherein the various letters have the same meaning as above:

III
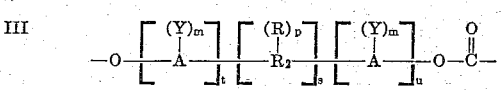

The following examples will illustrate the practice of the present invention, it being understood that they are illustrative only and are not to be taken as limiting in any way.

*Example 1*

In this example, technical hydrogenated Bisphenol-A, or 2,2-bis-(4-hydroxycyclohexyl)-propane was used as received. In the preparation of the polycarbonate material, phosgene was bubbled at the rate of 0.40 gram per minute into a stirred solution of 48 grams (0.20 mole) of the hydrogenated Bisphenol-A and 500 cc. of dry pyridine at a temperature of 30 to 35° C. After about 70 minutes or at the point where an excess of about 40% of phosgene was reached, the reaction mixture had increased slightly in viscosity, the resultant polymer was precipitated, washed with isopropanol and dried for 16 hours at 80° C. The polymer was found to be insoluble in dioxane, which is a common solvent for polycarbonate materials.

*Example 2*

Example 1 was repeated except that the hydrogenated Bisphenol-A was first washed with hot acetone. The resulting polymer had an intrinsic viscosity of 0.17 in tetrachloroethane but softened at about 225 to 250° C., which is substantially above the 180–200° C. softening temperature obtained with unhydrogenated Bisphenol-A.

The polymer was a white powdery material which dissolved readily in chloroform and tetrachloroethane, but it was not completely soluble in dioxane or pyridine.

The materials of this invention, as will be seen above, are characterized by a substantially higher softening temperature than usual polycarbonate materials and will thus be particularly useful in applications where higher temperatures are encountered. Their limited solubility or complete insolubility in usual polycarbonate solvents, such as dioxane and pyridine, indicates their use where resistance to such materials is required. The unique polycarbonates described herein are further characterized by improved hydrolytic stability. By reason of their structure, they are more susceptible to crosslinking by X-ray than are normal polycarbonates.

The materials of this invention are useful in any applications where a flexible, tough coating or film is required. Thus, for instance, they are useful for insulating wire. They are also useful for making molding compounds which may be used as such or filled with other materials, such as wood flour, silicas in various forms, divided black, divided metal, etc. Films of the material made in conventional well-known manners are useful as electrical insulating materials, wrapping or packaging materials, containers, liners and sound recording and other tapes. Products of the invention may also be obtained in fibrous form and are also useful as laminating adhesives and as adhesives for other uses.

What I claim as new and desire to secure by Letters Patent of the United States is:

1. A linear, high molecular weight carbonate polymer consisting of recurring structural units of the formula

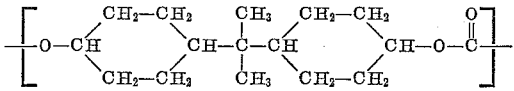

said carbonate polymer having a softening point of at least 225° C. and being substantially insoluble in pyridine.

2. A film of the carbonate polymer of claim 1.
3. A fiber of the carbonate polymer of claim 1.

References Cited by the Examiner
UNITED STATES PATENTS

| | | | |
|---|---|---|---|
| 2,536,989 | 1/48 | Von Glahn | 260—47 |
| 2,950,266 | 8/60 | Goldblum | 260—47 |
| 2,997,459 | 8/61 | Schnell | 260—77.5 |
| 3,022,272 | 2/62 | Schnell | 260—77.5 |
| 3,136,741 | 6/64 | Schnell | 260—77.5 |

LEON J. BERCOVITZ, *Primary Examiner.*

H. N. BURSTEIN, DONALD E. CZAJA, *Examiners.*